United States Patent [19]

Lelandais

[11] 4,363,041
[45] Dec. 7, 1982

[54] DUAL CAPSTAN TAPE TRANSPORT HAVING CONTROLLED TAPE TENSION

[75] Inventor: Guy Lelandais, Bures sur Yvette, France

[73] Assignee: Enertec, Montrouge, France

[21] Appl. No.: 219,454

[22] Filed: Dec. 22, 1980

[30] Foreign Application Priority Data

Dec. 26, 1979 [FR] France ............................ 79 31649

[51] Int. Cl.³ .................... G11B 15/18; B65H 25/22
[52] U.S. Cl. .................... 360/71; 360/74.3; 360/96.2; 360/130.21; 242/189; 226/195
[58] Field of Search ............... 360/71, 73, 74.3, 96.2, 360/96.3, 90, 105, 130.21; 242/189, 198–203, 209; 226/24–25, 111, 178, 181, 195

[56] References Cited

U.S. PATENT DOCUMENTS

| 3,583,618 | 6/1971 | Lewis. | |
|---|---|---|---|
| 3,861,573 | 1/1975 | Kawasaki et al. | |
| 3,903,544 | 9/1975 | Nakamichi | 360/96 |
| 3,930,268 | 12/1975 | Uemura | 360/96 |
| 4,213,160 | 7/1980 | Shum et al. | 360/71 X |

FOREIGN PATENT DOCUMENTS

| 1549132 | 4/1971 | Fed. Rep. of Germany. | |
|---|---|---|---|
| 2217763 | 9/1974 | France. | |
| 1525346 | 9/1978 | United Kingdom | 360/71 |

*Primary Examiner*—John H. Wolff
*Attorney, Agent, or Firm*—Dale Gaudier

[57] ABSTRACT

This invention relates to a tape transport for use with a transducer to transport tape along a predetermined path extending past the transducer, comprising two capstans, each disposed at a respective end of the predetermined path; two rollers, each disposed adjacent a respective one of the capstans and arranged to guide tape beyond the respective end of the path in partial wrapping engagement about its respective capstan; two motors each coupled to a respective one of the capstans; and a control circuit coupled to the motors and arranged to control operation thereof to drive the capstans at differing torques whereby to induce a controlled tension in tape extending along the path. One of the motors is driven by an independent source of signals, and the other is driven so as to be dependent, in part, of the operation of the first motor.

7 Claims, 4 Drawing Figures

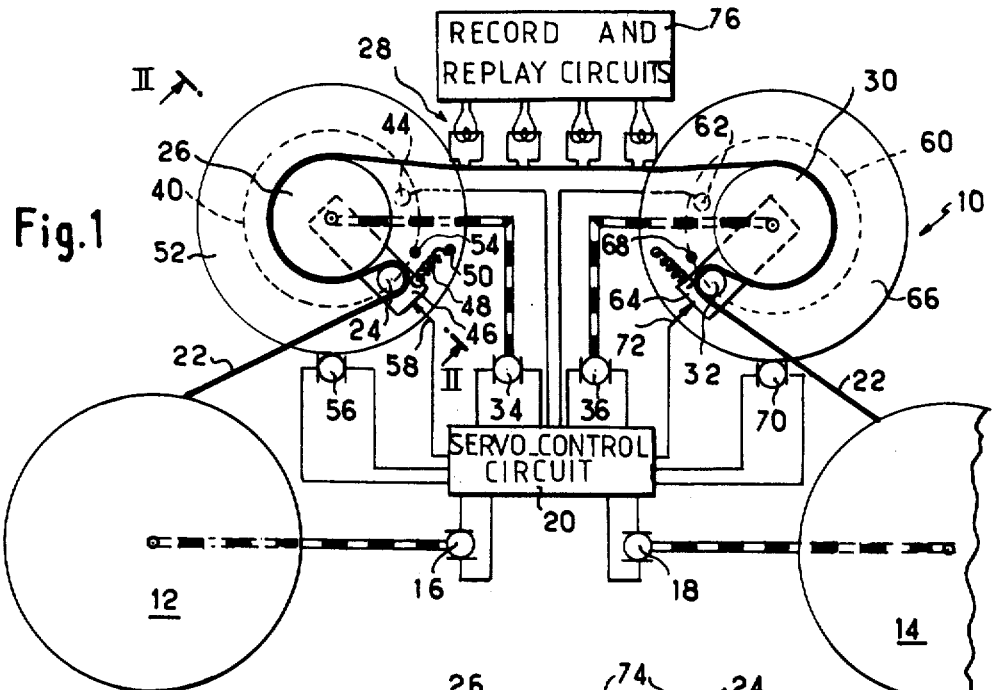
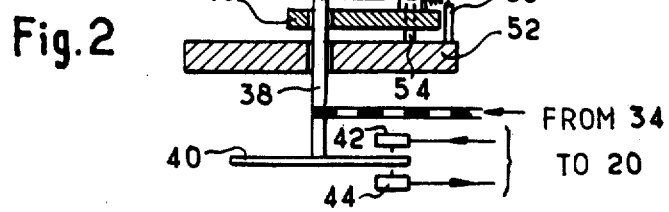
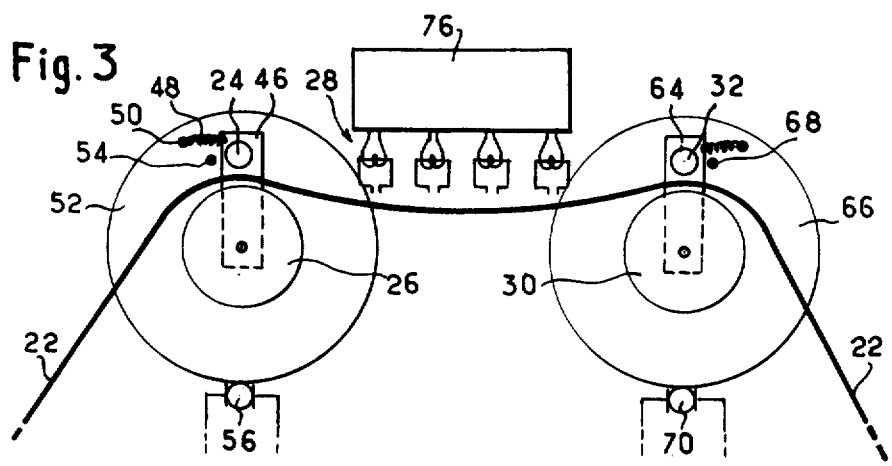

DUAL CAPSTAN TAPE TRANSPORT HAVING CONTROLLED TAPE TENSION

BACKGROUND OF THE INVENTION

This invention relates to a tape transport for use with transducer means to transport tape along a predetermined path extending past said transducer means, comprising two capstans, each disposed at a respective end of said predetermined path; two rollers, each disposed adjacent a respective one of the capstans and arranged to guide tape beyond the respective end of the path in partial wrapping engagement about its respective capstan; two drive means each coupled to a respective one of said capstans; and control means coupled to the drive means and arranged to control operation thereof to drive said capstans at differing torques whereby to induce a controlled tension in tape extending along said path.

Such tape transports are used with electro-magnetic transducers to transport magnetic recording tape along a predetermined path extending past the transducer, during recording and replay of signals on the tape. In order to provide high fidelity of signal reproduction, which requires an accurate control of tape tension, various techniques are commonly employed. Thus, movement of the tape past the transducers is generally effected, either directly or indirectly, by one or two capstans, driven by an electric motor.

Systems are known, in which two capstans are driven by respective motors to control tape tension, these motors being both driven by respective signals derived directly from an independent source.

For instance, U.S. Pat. No. 3,861,573 (Kawasaki & al.) describes a system with two reference signal generators which supply separate reference signals to a multiplexed differential amplifier for comparison with respective speed signals from tachometers.

In various other systems, such as described in the U.S. Pat. Nos. 3,903,544; 3,930,268; 3,869,723 and 4,122,504, only one drive motor is provided, and either various methods, for example differently-sized pulleys (U.S. Pat. No. 3,583,618) or different contact pressures (U.S. Pat. No. 3,390,268) are used to control tension, or else the capstans are driven in unison (U.S. Pat. Nos. 3,869,723 and 4,122,504). In U.S. Pat. No. 4,097,005 (Sleger), only one capstan is in fact driven.

Such systems still have the problem of certain inaccuracy of the control of tape tension, of vibration in the movement of the tape and of distortion of the produced signal such as wow and flutter, specially under severe conditions such as accelerations or large temperature variations.

SUMMARY OF THE INVENTION

Briefly, this invention is directed to a tape transport designed to overcome the aforesaid problems characterized by two capstans and respective capstan motors, one of which is driven by an independent source of signals, and the other of which is driven so as to be dependent, in part, of the operation of the first motor.

More precisely, the circuit controlling the operation of the motors includes a first and a second servo-control loop; the first servo-control loop includes the first motor and is responsively coupled to an independent source of oscillatory signals to control the operation of the first motor in accordance with the frequency thereof; the second servo-control loop includes the second motor and is normally responsively coupled to a controlled source of oscillatory signals to control the operation of the second motor in accordance with the frequency thereof, the controlled source being responsively coupled to the first servo-control loop to generate its oscillatory signals in dependence upon the operation of the first motor. The controlled source of oscillatory signals is responsively coupled to means arranged to sense the torques developed by the motors.

For instance, the controlled source of oscillatory signals comprises a voltage controlled oscillator responsively coupled to a comparator which is responsively coupled to a comparator which is responsively coupled to a reference signal source and to a differential amplifier receiving signals representative of the torques developed by the motors; comparison means are arranged to sense the difference in the speeds of the capstans and to couple the second servo-control loop to the independent source if the speed difference exceeds a predetermined level. Each of two rollers used to control tape supply and take-up tension and co-operating with a respective capstan may be mounted for movement along an arcuate path about its respective capstan, and urged in a direction tending to increase the extent of the wrapping engagement of the tape about this capstan. Preferably, these rollers are selectively movable in directions opposite to those in which they are normally urged, whereby to decrease the wrapping engagement of the tape and facilitate threading of tape in said transport.

BRIEF DESCRIPTION OF THE DRAWINGS

A tape transport in accordance with this invention will now be described, by way of example, with reference to the accompanying drawings, in which:

FIG. 1 is a schematic plan view of a magnetic tape recorder incorporating the tape transport;

FIG. 2 is a sectional view on the line II—II of FIG. 1;

FIG. 3 is a fragmentary plan view of the recorder illustrating the method of threading tape thereon.

DETAILED DESCRIPTION OF THE INVENTION

Figure 4:
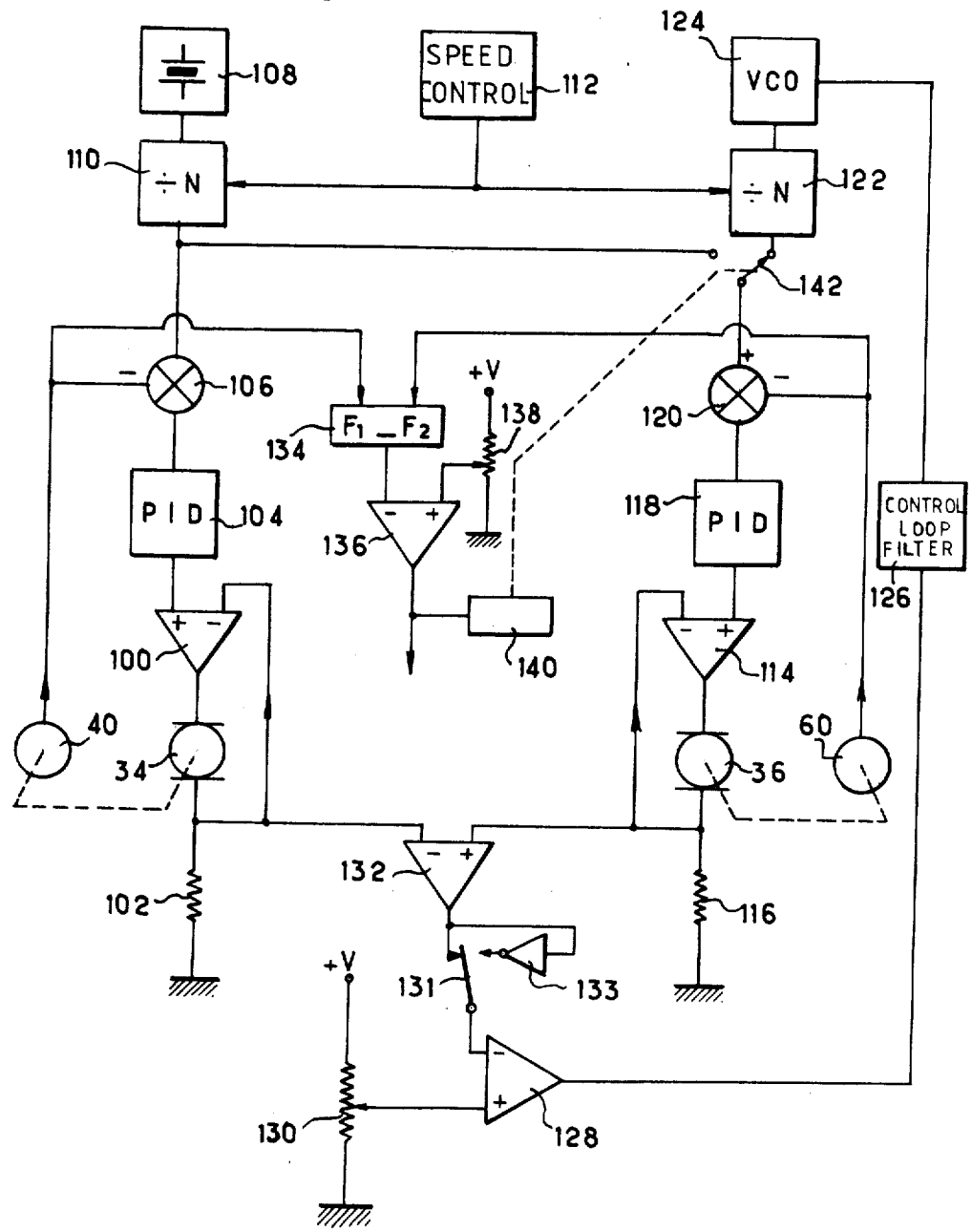
FIG. 4 is a block schematic diagram of part of a servo-control circuit of the tape transport.

Referring to FIGS. 1 and 2, a tape recorder indicated generally at 10 has two tape spools 12 and 14 which may be used interchangeably for tape supply and tape take-up in accordance with the direction of tape movement. Each spool 12 and 14 is driven by a respective electric motor 16, 18 under the control of a servo-control circuit 20.

As is shown in FIG. 1, tape 22 extends from the spool 12 to a first tension roller 24, around which it passes through approximately half a turn. The tape 22 is then wrapped around rather more than half the circumference of a first capstan 26, from which it subsequently extends past four electromagnetic transducers 28 to a second capstan 30. This capstan 30 and an associated tension roller 32 are arranged symmetrically with respect to the capstan 26 and roller 24, and the tape 22 extends around them in a similar manner before reaching the spool 14.

Each capstan 26, 30 is arranged to be individually driven by a respective printed-circuit electric motor 34, 36 controlled by the servo-control circuit 20. To this end, and as best shown by FIG. 2, the capstan 26 is mounted at the top of a shaft 38 coupled to the motor 34. The bottom of the shaft 38 carries a transparent tachometer disc 40, marked with several thousand equi-spaced radially-extending opaque lines, sandwiched between a light source 42 and an optical detector 44. As the disc 40 rotates with the capstan 26, the lines regularly interrupt the light path to the detector 44, the output of which therefore comprises a pulsed signal having a frequency indicative of the speed of rotation of the capstan 26. This tachometer signal is supplied to the servo-control circuit 20 as a feedback signal for servo-control in known manner of the energisation of the motor 34 and thus of the speed of the capstan 26.

The tension roller 24 is rotatably mounted on an arm 46 which is freely pivoted on the shaft 38 and which is urged anti-clockwise (as viewed in FIG. 1) by a tension spring 48 secured to the arm 46 and to a post 50 mounted on a wheel 52. The wheel 52, which carries a second post 54 near to the post 50, is also freely pivoted on the shaft 38 and is arranged to be angularly displaced about this shaft 38 by an electric motor 56. A position sensor, indicated diagrammatically at 58 in FIG. 1, provides another feedback signal indicative of the position of the arm 46, to the servo-conical circuit 20 for servo-control in known manner of the motor 16 driving the spool 12.

The capstan 30 and the roller 32 are arranged in the same manner as the capstan 26 and the roller 24, together with parts including a disc 60, an optical detector 62, an arm 64, a wheel 66, a post 68, a motor 70 and a sensor 72 (corresponding to the parts referenced 40, 44, 46, 52, 54, 56 and 58 respectively). The capstans 26 and 30 and the tension rollers 24 and 32 have circumferential grooves 74 of conventional form, as indicated in FIG. 1, to prevent entrainment of air between their respective surfaces and the tape at high tape speeds. The transducers 28 are coupled to the usual record and replay signal conditioning circuits which are ancillary to this invention and are therefore merely indicated generally at 76.

During operation, and assuming tape movement from the spool 12 to the spool 14, the tape 22 is moved past the transducers 28 by the capstans 26 and 30 as a consequence of frictional engagement between the capstans and the tape. In contrast to previously-used arrangements, each capstan 26 and 30 is driven separately by its respective motor 34, 36, in accordance with the energising signals which are supplied thereto by the servo-control circuit 20 and which are derived in part from the tachometer feedback signals from the detectors 44 and 62. Furthermore, the servo-control circuit 20 is arranged to energise the motors 34, 36 such that the "take-up" capstan (in the case under consideration, the capstan 30) is driven at a somewhat higher torque than the "supply" capstan (in this case, the capstan 26). Consequently, the capstan 26 tends to log the capstan 30 and the portion of the tape 22 extending along the path between the capstans 26 and 30 past the transducers 28 is placed under considerable tension, thereby promoting flatness of the tape 22 and close, even contact between the tape 22 and the transducers 28. If the direction of tape movement is reversed, the circuit 20 responds to drive the capstan 26 (now the "take-up" capstan) at higher torque than the capstan 30 (the "supply" capstan).

The spools 12 and 14 are driven by their respective motors 16 and 18, in response to energising signals from the circuit 20, to maintain the tension roller arms 46 and 64 at predetermined positions. These positions, which are sensed by the sensors 58 and 72, are chosen to maintain the tape 22 at the desired tension between the spool 12 and the capstan 26, and between the spool 14 and the capstan 30. The frictional engagement between the tape 22 and the capstans 26 and 30 effectively prevents the high tape tension between the capstans 26 and 30 from being propagated along the tape beyond the capstans 26 and 30. Thus the tension beyond the capstans 26 and 30 can be controlled separately and independently from the tension along the tape path past the transducers 28, and can be set to a value different from the tension along that path. In particular it can be set significantly lower, at a value appropriate to the unwinding of tape from, and more especially to the even take-up of tape onto, the spools 12 and 14.

Thus the arrangement shown in FIG. 1 enables the conflicting requirements on tape tension at different point in the tape path to be reconciled.

When it is desired to thread a tape 22 on the tape transport 10, the servo-control circuit 20 can be operated by a control (not shown) to energise the motors 56 and 70. This causes the wheels 52 and 66 to be driven from the positions shown in FIG. 1 to those shown in FIG. 3. In particular, the posts 54 and 68 engage the arms 46 and 64 respectively during this operation, pushing them round the capstans 26 and 30 towards the transducers 28, as indicated in FIG. 3. Furthermore, the transducers 28 can be arranged, if desired, to be retracted (for example, by motor-driven cams or levers) away from their normal positions for tape record and replay. Tape threading now involves no more than inserting the tape 22 between the capstan 26 and the tension roller 24, and between the capstan 30 and the tension roller 32, and next to the transducers 28, along the path shown in FIG. 3. It can be seen that this operation is very simple and does not involve any delicate manipulation of the tape 22, for example to form loops to fit around rollers. Thereafter the servo-control circuit 20 is operated to re-energise the motors 56 and 70 in the opposite sense, whereupon the wheels 52 and 66 are driven back to the positions shown in FIG. 1, thereby automatically arranging the tape 22 into the required serpentine path around the capstans 26, 30 and the rollers 24, 32. At the same time the transducers 28 are returned, if necessary, to their normal operative positions to engage the tape 22. It will be understood that the above-described sequence of operations may require the use, for example, of limit switches to control energisation of the motors 56 and 70 in accordance with the position of the wheels 52 and 66; the arrangement of such details will be obvious to those skilled in the art and has therefore been omitted from the drawings for clarity.

FIG. 4 shows a block schematic diagram of one possible arrangement of the part of the servo-control circuit 20 for controlling the capstan motors 34 and 36.

Referring to FIG. 4, the motor 34 is supplied with energising current by a servo-control amplifier 100, one input of which receives a feedback voltage developed by this energising current across a low-value resistor 102 connected in the current path to ground of the motor 34. The other input of the amplifier 100 receives, via a proportional integrator/differentiator 104, the output from phase detector 106. This phase detector 106 is supplied with the output signal derived with the tachometer disc 40 coupled to the motor 34, and with a pulsed signal fed thereto from a crystal oscillator 108 via a variable divider 110. The loop 40 - 106 - 104 - 100 - 34 operates in known manner to drive the motor 34 at a speed, as measured with the tachometer disc 40, which is dependent on the frequency of the pulsed signal supplied by the divider 110. The frequency of this signal depends on the frequency of the oscillator 108 (for example, 1.6 MHz) and the division ratio N of the divider 110. A speed control 112 is coupled to the divider 110 to enable different values of N, and thus different speeds of the motor 34, to be selected.

The motor 36 is supplied with energising current in similar manner by a servo-control amplifier 114 associated with a low-value resistor 116, a proportional integrator/differentiator 118 and a phase detector 120. This phase detector 120 receives the motor-speed signal derived with the tachometer disc 60, and normally, a pulsed signal from a variable divider 122 which is similar to the divider 110, and the division ratio N of which is likewise selected by the speed control 112.

However, in contrast to the divider 110, the divider 122 is supplied with a pulsed signal from a voltage-controlled oscillator (VCO) 124, which is responsive to a control voltage supplied thereto, via a control-loop filter 126, by a comparator 128. One input of the comparator 128 is coupled to receive a reference voltage from an adjustable resistor 130, while the other input receives an output signal, via a switch 131, from a differential amplifier 132, the inputs of which are coupled to receive the feedback voltages developed across the resistors 102 and 116.

The inherent operating characteristics of the printed-circuit motors 34 and 36 are such that the torques they develop are proportional to the energising currents flowing through them. Thus, the feedback voltages across the resistors 102 and 116 are indicative of the torques developed by the respective motors 34 and 36, and the output signal of the differential amplifier 132 is indicative of the difference in these torques (that is, the difference in the torques applied to the capstans 26 and 30). The VCO 124 will be controlled by the comparator 128 to supply a pulsed signal to the phase detector 120, via the divider 122, such that the output signal of the differential amplifier 132 remains equal to the reference voltage preset by adjustment of the adjustable resistor 130. Consequently, the motor 36 will in effect be energised to develop a torque which differs from that developed by the motor 34 by an amount dependent upon (and controllable by adjustment of) the magnitude of this preset reference voltage. If the direction of tape movement is reversed, the switch 131 is moved from the position shown to interpose an inverter 133 between the differential amplifier 132 and the comparator 128, thereby inverting the relationship between the input signals to the differential amplifier 132 required to maintain balance at the comparator 128. In practice, the actual frequency of the output signal of the VCO 124 will hardly differ from that of the oscillator 108; the difference in torque will primarily arise from differences in phase between the two signals. Any substantial difference in frequency is indicative of a malfunction, such as loss of lock in the VCO 124, which, to avoid damage to the tape 22 and/or tape transport 10 should be detected and remedied. Accordingly, the feedback signals from the tachometers 40 and 60 are also supplied to a frequency comparator 134. This provides a signal representative of the frequency difference to one input of a comparator 136, the other input of which receives a reference voltage from an adjustable resistor 138. The output of the comparator 136 controls a relay coil 140 associated with a changeover switch 142 interposed between the variable divider 122 and the phase detector 120. This changeover switch is normally in the position shown in FIG. 4, coupling the phase detector 120 to receive the output signal from the divider 122. However, in the event that the frequency difference between the feedback signals from the tachometers 40 and 60 exceeds a limit corresponding to the reference voltage preset by adjustment of the resistor 138, the comparator 136 energises the relay coil 140. Thereupon the switch 142 changes over to couple the phase detector 120 to receive the same signal as the phase detector 106, from the divider 110. This results in both control loops being fed with the same reference signal, enabling the VCO 124 to re-establish frequency lock.

I claim:

1. A tape transport for use with transducer means to transport tape along a predetermined path extending past said transducer means, comprising:

two capstans, each disposed at a respective end of said predetermined path;

two rollers, each disposed adjacent a respective one of said capstans and arranged to guide tape beyond the respective end of said path in partial wrapping engagement about its respective capstan;

two drive means each coupled to a respective one of said capstans; and control means coupled to said drive means and arranged to control operation thereof to drive said capstans at differing torques whereby to induce a controlled tension in tape extending along said path;

wherein said control means has a first servo-control loop known per se including one of said drive means and responsively coupled to an independent source of oscillatory signals to control the operation of said one drive means in accordance with the frequency thereof, and wherein said control means has a second servo-control loop including the other of said drive means and normally responsively coupled to a controlled source of oscillatory signals to control the operation of said other drive means in accordance with the frequency thereof, the controlled source being responsively coupled to said first servo-control loop to generate its oscillatory signals in dependence upon the operation of said one drive means.

2. A tape transport according to claim 1, wherein said controlled source of oscillatory signals is responsively coupled to means arranged to sense the torques developed by said one and said other drive means.

3. A tape transport according to claim 2, wherein said controlled source of oscillatory signals comprises a voltage controlled oscillator responsively coupled to a comparator which is responsively coupled to a reference signal source and to a differential amplifier receiving signals representative of the torques developed by said drive means.

4. A tape transport according to claim 1, comprising comparison means arranged to sense the difference in the speeds of said capstans and to couple said second servo-control loop to said independent source if said speed difference exceeds a predetermined level.

5. A tape transport according to claim 1, wherein each of said rollers is mounted for movement along an arcuate path about its respective capstan, and is urged in a direction tending to increase the extent of said wrapping engagement of said tape.

6. A tape transport according to claim 5, wherein said rollers are used to control tape supply and take-up tension.

7. A tape transport according to claim 6, wherein said rollers are selectively movable in directions opposite to those in which they are mormally urged, whereby to decrease said wrapping engagement of said tape and facilitate threading of tape in said transport.

* * * * *